May 17, 1949.  R. S. CHILDS  2,470,288
EXCESS PRESSURE PROTECTED PRESSURE RESPONSIVE DEVICE
Filed April 24, 1944
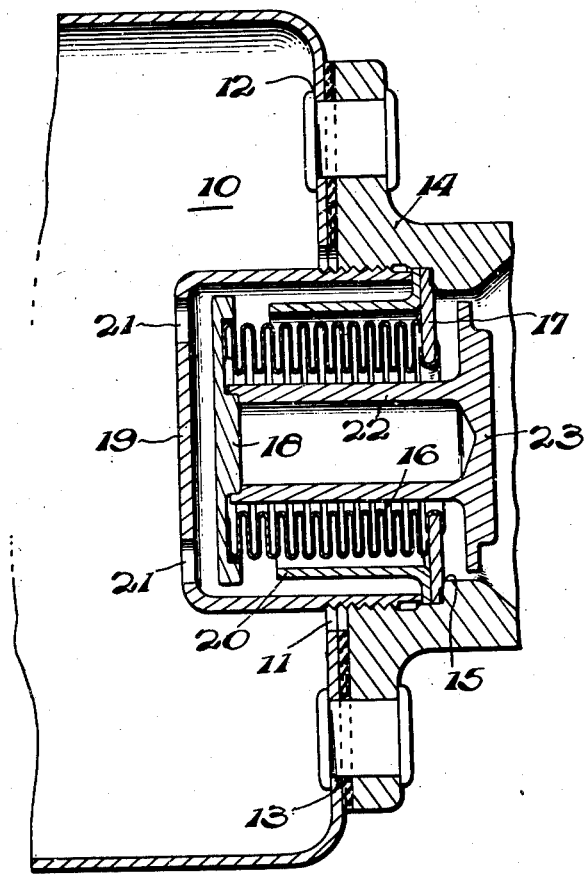
INVENTOR.
Robert S. Childs.
BY
ATTORNEY Patented May 17, 1949

2,470,288

UNITED STATES PATENT OFFICE 2,470,288

EXCESS PRESSURE PROTECTED PRESSURE RESPONSIVE DEVICE

Robert S. Childs, Englewood, N. J., assignor to Bendix Aviation Corporation, Teterboro, N. J., a corporation of Delaware Application April 24, 1944, Serial No. 532,469

2 Claims. (Cl. 137—156)

This invention relates to pressure sensitive devices and more particularly to safety expedients adapted to protect pressure sensitive devices against excessively high pressures.

Instruments for measuring, controlling, or otherwise utilizing pressures and pressure variations generally depend upon the yieldable action of a bellows or diaphragm. In many practical applications it is necessary to provide operation over a given pressure range and yet not impair this operation after subjecting the bellows or diaphragm to a pressure several times that of the working range. With conventional designs the wall thickness of the bellows or diaphragm is made sufficiently thick to withstand the overpressure required without permanent deformation, at the expense of flexibility throughout the working pressure range. This loss of flexibility, hitherto, has been made up only by introducing or increasing effective mechanical amplification of the bellows or diaphragm motion, or by increasing the size of the bellows or diaphragm in some cases. An overpressure requirement, therefore, has often made an otherwise desirable design quite impractical.

The present invention contemplates the provision of a novel expedient whereby the foregoing disadvantages are overcome so that a yieldable pressure responsive member may be used having a flexibility determined by working pressures only and at the same time any permanent deformation or rupturing of the yieldable member is prevented at pressures many times that of the working pressure.

An object of the present invention, therefore, is to provide a novel protective device for pressure sensitive members whereby such members are exposed to pressures falling only within a predetermined working pressure range.

Another object of the invention is to provide a novel protective device for preventing the action of overpressures such as those due to surges, etc., for example, on a flexible member designed to operate for a given pressure range.

A further object is to provide a novel safety expedient for pressure sensitive devices designed to operate over given pressure ranges whereby such devices are protected against the effect of pressures exceeding that of the working pressure range.

Another object is to provide a novel safety device for pressure sensitive bellows or diaphragms comprising a normally open protective chamber confining the bellows or diaphragm therein and a valve operated by the bellows or diaphragm for closing the protective chamber in response to pressures exceeding the working pressures whereby the bellows or diaphragm is sealed off from the acting pressures so that no matter how high the pressure is raised, the maximum pressure on the bellows or diaphragm is only approximately working pressure.

The above and further objects and novel features of the invention will more fully appear from the following detailed description when the same is read in connection with the accompanying drawing. It is to be expressly understood, however, that the drawing is for purposes of illustration only and are not intended as a definition of the limits of the invention.

In the drawing the single figure is a side elevation view in section of the novel protective device of the present invention for pressure sensitive members.

Referring now to the drawing the present invention is there shown as applied to a variable pressure chamber 10 provided with a central opening 11 and having apertures 12 and 13 in the walls thereof. Fastened to the chamber by way of suitable means cooperating with apertures 12 and 13 is a flanged casing 14 provided with an annular shoulder 15 therein.

A flexible bellows 16 is mounted within casing 14, the bellows being fastened at one end to a plate 17, the plate, in turn, being secured within the casing against shoulder 15 whereby one end of the bellows is fixed against motion within the casing. The movable end of the bellows on the other hand, has sealably connected thereto a closure member 18 including an annular valve member which moves in accordance with the expansion and contraction of the bellows.

Casing 14 is threaded for the reception of a cup-shaped housing 19 which supports a flanged sleeve member 20 against plate 17, the sleeve member substantially surrounding and confining bellows 16 therein. Housing 19 extends into chamber 10 by virtue of the opening 11 and is provided with a plurality of openings 21 whereby the pressures within chamber 10 are freely communicated to the interior of the housing to normally act upon the bellows.

Member 18 which is carried by the movable end of the bellows has secured thereto or formed integrally therewith a plunger 22 which is mounted within the bellows and provided at its free end with a plate member 23, the latter being movable in accordance with bellows operation. Member 23 may engage and operate a linear transmitter of the type described and claimed in my copending application Serial No. 491,682, filed June 21, 1943 which issued as Patent Number 2,441,869 on May 18, 1948, whereby the operation of the bellows may be transmtted to a distant point for the purpose of indicating bellows operation at that point or for the purpose of controlling any desired expedient at the distant point in accordance with bellows operation.

During the presence of pressures within chamber 10 falling within the working pressure range for which bellows 16 has been designed, the bellows will expand and contract with pressure rise and fall thereby moving annular member 18, plunger 22 and plate member 23 therewith. When the maximum working pressure is reached within housing 19, bellows 16 will have contracted sufficiently to bring member 18, which acts in the nature of a valve, into contact with the free end of sleeve 20 thereby closing off the bellows from increasing pressures within chamber 10. Sleeve 20, therefore, defines a protective chamber for the bellows whereby, when the protective chamber is closed, no matter how high the pressure within chamber 10 is raised, the maximum pressure on the bellows will be only that within the range of the working pressures for which the bellows has been designed. Moreover, any continued increase in pressure within chamber 10 after annular member 18 has engaged sleeve 20 will act to improve the seal of the protective chamber from the pressure chamber. An added feature of the above novel arrangement is that the protective valve also serves the function of a mechanical stop, thereby preventing overtravel of any mechanism that may be actuated by plate member 23 by virtue of bellows motion.

It will now become apparent to those skilled in the art that a novel protective device has been provided whereby a diaphragm, bellows or a plurality of diaphragms may be used whose flexibility need be determined only by working pressures and at the same time any permanent deformation or rupturing thereof is prevented when the pressures exceed many times the working pressure.

Although one embodiment of the present invention has been illustrated and described in detail, it is to be expressly understood that the invention is not limited thereto. Various changes may be made in the design and arrangement of the parts without departing from the spirit and scope of the invention, as will now be understood by those skilled in the art. For a definition of the limits of the invention, reference will be had primarily to the appended claims.

I claim:

1. In combination, a pressure responsive device including an annular expansible and contractable bellows responsive to variable pressures acting thereon, a variable pressure chamber normally in communication with said device, means fixedly supporting one end of said bellows, an annular valve member whose diameter exceeds the diameter of said bellows secured to the opposite end of said bellows which is movable in response to changes in condition of said bellows, and means surrounding said bellows and cooperating with said valve member to form a protective chamber for said bellows which is substantially sealed from said variable pressure chamber when said valve member has been moved a predetermined distance by said bellows in response to change of pressure in said variable pressure chamber.

2. In combination, a pressure responsive device including an annular expansible and contractable bellows responsive to variable pressures acting thereon, a variable pressure chamber normally in communication with said device, means fixedly supporting one end of said bellows, an annular valve member whose diameter exceeds the diameter of said bellows secured to the opposite end of said bellows which is movable in response to changes in condition of said bellows, and means comprising an annular sleeve member surrounding said bellows for cooperation with said valve member to form a protective chamber for said bellows which is substantially sealed from said variable pressure chamber when said valve member has been moved a predetermined distance by said bellows in response to change of pressure in said variable pressure chamber.

ROBERT S. CHILDS.

REFERENCES CITED

The following references are of record in the file of this patent:

UNITED STATES PATENTS

| Number | Name | Date |
|---|---|---|
| 1,239,565 | Collinson | Sept. 11, 1917 |
| 1,278,761 | Schneider | Sept. 10, 1918 |
| 1,382,498 | Geisler | June 21, 1921 |
| 2,058,858 | Fetyko | Oct. 27, 1936 |